United States Patent
Deidda et al.

(10) Patent No.: US 8,185,902 B2
(45) Date of Patent: May 22, 2012

(54) METHOD, SYSTEM AND COMPUTER PROGRAM FOR DISTRIBUTING A PLURALITY OF JOBS TO A PLURALITY OF COMPUTERS

(75) Inventors: Paolo Deidda, Rome (IT); Fabio Benedetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 12/202,289

(22) Filed: Aug. 31, 2008

(65) Prior Publication Data
US 2009/0113442 A1 Apr. 30, 2009

(30) Foreign Application Priority Data
Oct. 31, 2007 (EP) .................................. 07119759
Aug. 5, 2008 (EP) .................. PCT/EP2008/060297

(51) Int. Cl.
*G06F 9/46* (2006.01)
(52) U.S. Cl. ......... 718/102; 718/100; 718/103; 718/104
(58) Field of Classification Search .................. None
See application file for complete search history.

(56) References Cited

U.S. PATENT DOCUMENTS

| | | | |
|---|---|---|---|
| 5,440,675 A | 8/1995 | Matsunaga et al. | 395/140 |
| 5,442,730 A | 8/1995 | Bigus | |
| 5,826,236 A | 10/1998 | Narimatsu et al. | 705/8 |
| 6,047,220 A | 4/2000 | Eryurek | |
| 6,256,651 B1 | 7/2001 | Tuli | |
| 6,647,377 B2 | 11/2003 | Jannarone | |
| 6,675,189 B2 | 1/2004 | Rehg et al. | |
| 6,961,720 B1 | 11/2005 | Nelken | |
| 7,003,475 B1 | 2/2006 | Friedland et al. | 705/9 |
| 7,093,004 B2 | 8/2006 | Bernardin et al. | 709/219 |
| 2002/0016785 A1 | 2/2002 | Sirgany | |
| 2003/0084157 A1 | 5/2003 | Graupner et al. | |
| 2004/0093351 A1 | 5/2004 | Lee et al. | |
| 2004/0098718 A1 | 5/2004 | Yoshii et al. | |

(Continued)

FOREIGN PATENT DOCUMENTS
WO WO2005006214 A1 1/2005
(Continued)

OTHER PUBLICATIONS

Graupner, S. et al., "A Framework for Analyzing and Organizing Complex Systems," HP Laboratories Technical Report, Palo Alto (2001) pp. 1-16.

(Continued)

*Primary Examiner* — Emerson Puente
*Assistant Examiner* — Sisley Kim
(74) *Attorney, Agent, or Firm* — Brevetto Law Group (57) ABSTRACT

Method and system for providing a mechanism for determining an optimal workload distribution, from a plurality of candidate workload distributions, each of which has been determined to optimize a particular aspect of a workload-scheduling problem. More particularly, the preferred embodiment determines a workload distribution based on resource selection policies. From this workload distribution, the preferred embodiment optionally determines a workload distribution based on job priorities. From either or both of the above parameters, the preferred embodiment determines a workload distribution based on a total prioritized weight parameter. The preferred embodiment also determines a workload distribution which attempts to match the previously determined candidate workload distributions to a goal distribution. Similarly, the preferred embodiment calculates a further workload distribution which attempts to maximize job throughput.

19 Claims, 7 Drawing Sheets

U.S. PATENT DOCUMENTS

| | | | |
|---|---|---|---|
| 2004/0205108 | A1 | 10/2004 | Tanaka |
| 2005/0076043 | A1* | 4/2005 | Benedetti et al. ............. 707/100 |
| 2005/0086098 | A1 | 4/2005 | Fulton et al. |
| 2005/0108074 | A1 | 5/2005 | Bloechl et al. |
| 2005/0240934 | A1 | 10/2005 | Patterson et al. |
| 2005/0267770 | A1 | 12/2005 | Banavar et al. |
| 2006/0136922 | A1 | 6/2006 | Zimberg et al. |
| 2006/0195847 | A1 | 8/2006 | Amano et al. |
| 2006/0218551 | A1 | 9/2006 | Berstis et al. |
| 2006/0259621 | A1* | 11/2006 | Ranganathan et al. ....... 709/226 |
| 2007/0039004 | A1 | 2/2007 | Guralnik et al. |
| 2007/0245300 | A1 | 10/2007 | Chan et al. |

FOREIGN PATENT DOCUMENTS

| | | | |
|---|---|---|---|
| WO | WO 2008/040563 A1 | 4/2008 | |

OTHER PUBLICATIONS

Sen, R. et al., "Distributed Allocation of Workflow Tasks in MANETs," Department of Computer Science & Engineering, Washington University in St. Louis (2007).

PCT International Search Report issued in PCT/EP2008/060297 dated Dec. 12, 2008.

Tarek F. Abdelzaher et al.; "A Utilization Bound for Aperiodic Tasks and Priority Driven Scheduling", IEEE Transaction, pp. 334-350, vol. 53, No. 3, Mar. 2004.

Stefano Squirtioni, "Comparing Different Recurrent Neural Architectures on a Specific Task from Vanishing Gradient Effect Perspective", pp. 380-385, 1-4244-0065-1, 2006 IEEE, Manuscript received Sep. 15, 2005.

\* cited by examiner

Fig. 1

| j₁ | Min | RAttr (j₁) |
|---|---|---|
| j₂ | Max | RAttr(j₂) |
| j₃ | Max | RAttr(j₃) |
| Jₙ | Max | RAttr(jₙ) |

Fig. 2

| j₁ | R1, R2 |
|---|---|
| j₂ | R1, R2, R3 |
| j₃ | R2, R3, R4, R6 |
| Jₙ | R2, R5 |

Fig. 3

| j₁ | R2, R1 |
|---|---|
| j₂ | R1, R3, R2 |
| j₃ | R2, R3, R6, R4 |
| Jₙ | R5, R2 |

Fig. 4

|  | $r_1$ | $r_2$ | $r_3$ | $r_4$ | $r_5$ |
|---|---|---|---|---|---|
| j₁ | 25 | 15 | 40 | 10 | 10 |
| j₂ | 0 | 70 | 30 | 0 | 0 |
| j₃ | 10 | 90 | 0 | 0 | 0 |
| Jₙ | $\underline{W}(r_1,j_k)$ | $\underline{W}(r_2,j_k)$ | $\underline{W}(r_3,j_k)$ | $\underline{W}(r_4,j_k)$ | $\underline{W}(r_5,j_k)$ |

|   | Priority | $r_1$ | $r_2$ | $r_3$ | $r_4$ | $r_5$ |
|---|---|---|---|---|---|---|
| j1 | 100 | 25 | 15 | 40 | 10 | 10 |
| j2 | 50 | 0 | 70 | 30 | 0 | 0 |
| j3 | 10 | 10 | 90 | 0 | 0 | 0 |
| Jn | $P_n$ | $W(r_1,j_n)$ | $W(r_2,j_n)$ | $W(r_3,j_n)$ | $W(r_4,j_n)$ | $W(r_5,j_n)$ |

Fig. 7

|   | $r_1$ | $r_2$ | $r_3$ | $r_4$ | $r_5$ |
|---|---|---|---|---|---|
| j1 | 2500 | 1500 | 4000 | 1000 | 1000 |
| j2 | 0 | 3500 | 1500 | 0 | 0 |
| j3 | 100 | 900 | 0 | 0 | 0 |

Fig. 8

| Solution | Job-Resource pair | Distribution $R_1$ | Distribution $R_2$ | Distribution $R_3$ | Distribution $R_4$ | Distribution $R_5$ |
|---|---|---|---|---|---|---|
| $S_1$ | J1R1,J2R2,J3R1 | 66.6 | 33.3 | 0 | 0 | 0 |
| $S_2$ | J1R2,J2R3,J3R1 | 33.3 | 33.3 | 33.3 | 0 | 0 |
| $S_3$ | J1R3,J2R2,J3R2 | 0 | 66.6 | 33.3 | 0 | 0 |

| Solution | Job-Resource pair | Total W | Total Normalized Weight |
|---|---|---|---|
| $S_1$ | J1R1,J2R2,J3R1 | 2500+3500+100=6100 | 34.66 |
| $S_2$ | J1R2,J2R3,J3R1 | 1500+1500+100=3100 | 17.61 |
| $S_3$ | J1R3,J2R2,J3R2 | 4000+3500+900=8400 | 47.72 |

Fig. 9

| | | R1 | | R2 | | R3 | | R4 | | R5 | |
|---|---|---|---|---|---|---|---|---|---|---|---|
| | | Distribution | Number of Jobs | Distribution | Number of Jobs | Distribution | Number of Jobs | Distribution | Number of Jobs | Distribution | Number of Jobs |
| GD | | 20% | | 20% | | 20% | | 20% | | 20% | |
| PNJ | | | 6 | | 7 | | 5 | | 8 | | 9 |
| | Job-Resource pair | | | | | | | | | | |
| CNJ($S_1$) | J1R1,J2R2,J3R1 | | 2 | | 1 | | 0 | | 0 | | 0 |
| CNJ($S_2$) | J1R2,J2R3,J3R1 | | 1 | | 1 | | 1 | | 0 | | 0 |
| CNJ($S_3$) | J1R3,J2R2,J3R2 | | 0 | | 2 | | 1 | | 0 | | 0 |

Fig. 10

|  | R1 Distribution | R2 Distribution | R3 Distribution | R4 Distribution | R5 Distribution | $\Delta ND_k$ |
|---|---|---|---|---|---|---|
| PD1 | 21.05263 | 21.05263 | 13.15789 | 21.05263 | 23.68421 | 26.53061 |
| PD2 | 18.42105 | 21.05263 | 15.78947 | 21.05263 | 23.68421 | 46.93878 |
| PD3 | 15.78947 | 23.68421 | 15.78947 | 21.05263 | 23.68421 | 26.53061 |

Fig. 11

|  | Job-Resource pair | R1 Number of Jobs | R2 Number of Jobs | R3 Number of Jobs | R4 Number of Jobs | R5 Number of Jobs |
|---|---|---|---|---|---|---|
| $S_1$ | J1R1,J2R2,J3R1 | 2 | 1 | 0 | 0 | 0 |
| $S_2$ | J1R2,J2R3,J3R1 | 1 | 1 | 1 | 0 | 0 |
| $S_3$ | J1R3,J2R2,J3R2 | 0 | 2 | 1 | 0 | 0 |

Fig. 12

| TNW_k | ΔND_k | TJD_k | OptD_k |
|---|---|---|---|
| 34.66 | 26.53061 | 33.333333 | 94.52394 |
| 17.61 | 46.93878 | 33.333333 | 97.88211 |
| 47.72 | 26.53061 | 33.333333 | 107.5839 |

METHOD, SYSTEM AND COMPUTER PROGRAM FOR DISTRIBUTING A PLURALITY OF JOBS TO A PLURALITY OF COMPUTERS

PRIORITY TO RELATED PATENT APPLICATION

This patent application claims priority to International Patent Application No. PCT/EP2008/060297, which was filed under the Patent Cooperation Treaty (PCT) on Aug. 5, 2008, and claims priority to European Patent Application No. 07119759.4 filed with the European Patent Office on Oct. 31, 2007, said applications expressly incorporated herein by reference in their entireties.

TECHNICAL FIELD

The present invention relates to a method, system and computer-usable medium for distributing a plurality of jobs to a plurality of computers.

BACKGROUND

Workload scheduling is an increasingly important component of IT (Information Technology) environments. Indeed, many grid computing environments are driven by the scheduling of work across a distributed set of resources (e.g. computation, storage, communication capacity, software licenses, special equipment etc.). Most grid systems include a job scheduler, to locate a machine on which to run a job submitted by a user. Simple job schedulers assign jobs to the next available machine whose resources match the needs of the job. However, more advanced schedulers implement a job priority system, wherein jobs with higher priorities are preferentially allocated to grid machines. Schedulers may also implement policies, providing various constraints on jobs, users, and resources (e.g. restricting grid jobs from executing at certain times of the day).

In essence, scheduling is an optimization problem, which is fairly straightforward when only one resource type (e.g. CPU) is involved. Further performance improvements may be achieved by including more resource variables in the scheduling process, the resulting multivariate optimization becomes a difficult mathematics problem. In attempting to simplify the problem, prior art workload distribution algorithms typically assume that the distribution problem is one of deploying substantially homogeneous jobs in a substantially homogeneous environment. Thus, these prior art algorithms fail to recognize that different jobs often have different resource requirements. Similarly, prior art algorithms typically fail to recognize the extent to which a given job deployment may influence subsequent jobs, thereby affecting the overall job throughput of a system.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

A method, system and/or computer-usable medium are disclosed for distributing a plurality of jobs to a plurality of computers. Such a method and system includes determining every possible pairing of the jobs to the computers, to produce a plurality of provisional distributions; ranking the provisional distributions according to the extent to which they satisfy the individual requirements of each job, ranking the provisional distributions according to the extent to which they match a predefined distribution; ranking the provisional distributions according to the extent to which they maximize a throughput of the computers; determining an optimal distribution from the rankings; and deploying the or each of the jobs to the or each of the computers in accordance with the optimal distribution.

In contrast with prior art workload-scheduling systems, the preferred embodiment considers the different aspects of both the jobs to be distributed and the resources to which the jobs might be distributed. To this end, one of the underlying principles of the preferred embodiment is that each job has different characteristics and should be individually optimized according to its own requirements Furthermore, the preferred embodiment differs from prior art workload-scheduling systems insofar as it recognizes the influence of a given job distribution on the operation of other subsequent jobs. In particular, the preferred embodiment recognizes that the deployment of a job to a given resource may cause that resource to be effectively reserved by the job, thereby preventing other subsequent jobs from being deployed to the resource in question.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

The invention itself, as well as further features and the advantages thereof, will be best understood with reference to the following detailed description, given purely by way of a non-restrictive indication, to be read in conjunction with the accompanying drawings, in which.

DETAILED DESCRIPTION

The particular values and configurations discussed in these non-limiting examples can be varied and are cited merely to illustrate at least one embodiment and are not intended to limit the scope of such embodiments.

Figure A. Overview

The preferred embodiment provides a mechanism for determining an optimal workload distribution, from a plurality of candidate workload distributions, each of which has been determined to optimize a particular aspect of a workload-scheduling problem. More particularly, referring to FIG. 1, the preferred embodiment determines (10) a workload distribution (($W(r_k, j_k)$)) based on resource selection policies. From this workload distribution (($W(r_k, j_k)$)), the preferred embodiment optionally determines (12) a workload distribution ($PW(r_k, j_k)$) based on job priorities.

Figure 1:
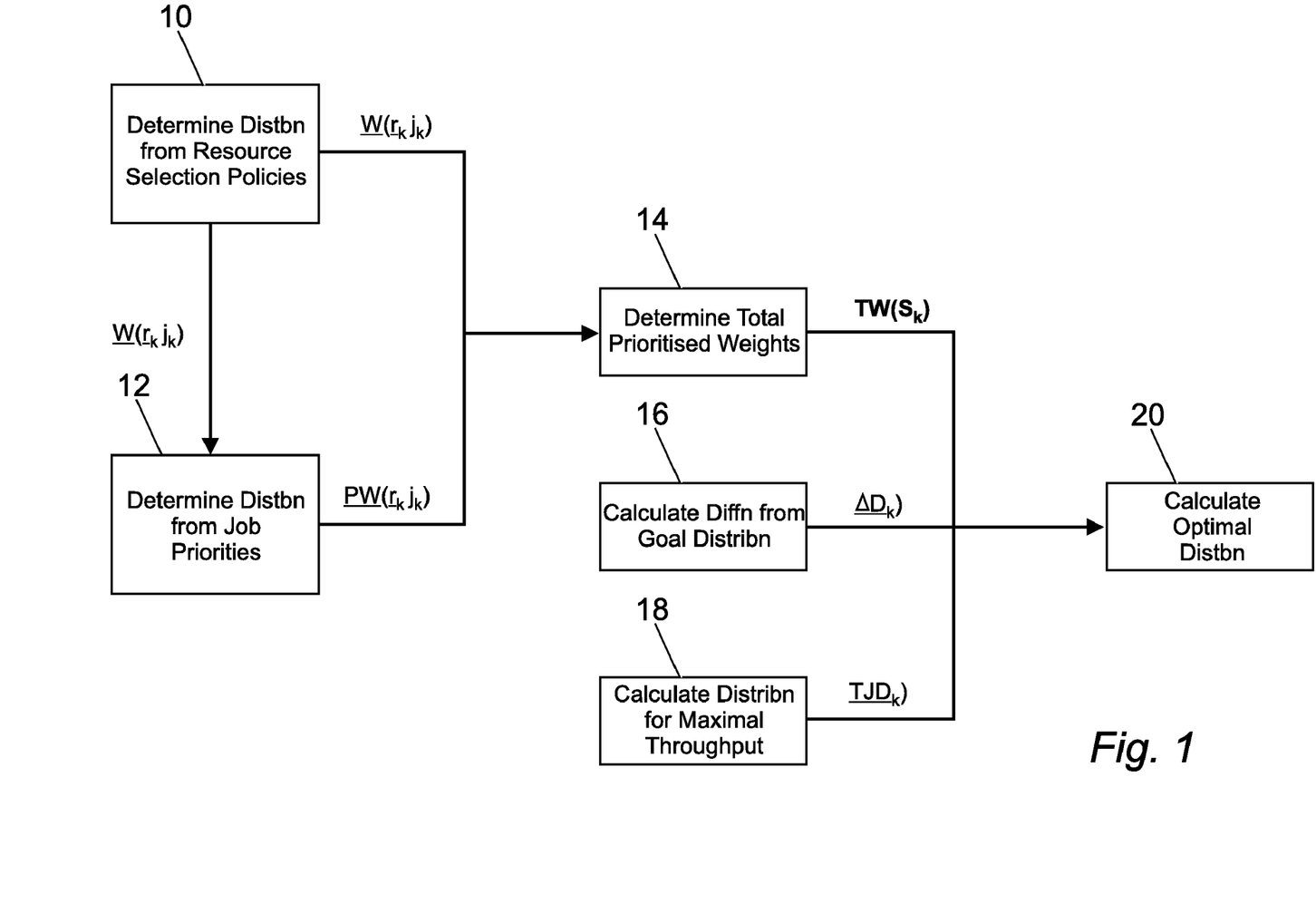
FIG. 1 illustrates a flowchart of the operation of the preferred embodiment.

From either or both of the above parameters, the preferred embodiment determines (14) a workload distribution based on a total prioritized weight parameter. The preferred embodiment also determines (16) a workload distribution which attempts to match the previously determined candidate workload distributions to a goal distribution. Similarly, the preferred embodiment calculates (18) a further workload distribution which attempts to maximize job throughput. From all these workload distributions, the preferred embodiment calculates (20) an overall optimal workload distribution, which effectively considers the following configurable factors: resource selection policies of each job; job priority (optional); work balancing; and job throughput.

In determining the overall optimal workload distribution, the preferred embodiment assesses and compares the merits of candidate job distributions on the basis of the above variables, by providing homogeneous values thereto (in the interval [0-100]) and developing an objective function which includes all of the variables.

For the sake of example, the preferred embodiment is described within the context of an IBM Tivoli Dynamic Workload Broker (ITDWB). However, it will be appreciated that the preferred embodiment is not limited to this implementation; and could instead be implemented in a variety of different software platforms.

B. More Detailed Description

Step 1 Determining a normalized independent workload distribution based on resource selection policy.

A job to be executed typically has a set of resource constraints (e.g. available disk space, memory etc.) which determine the targets (i.e. "capable" resources) to which the jobs can be submitted for execution. Each job also has a resource selection policy, which ranks the capable resources that satisfy the requirements of the job. These policies essentially comprise the maximization or minimization of a particular attribute of a capable resource. For example, a job that requires a lot of CPU processing, may have "MINIMIZE CPU UTILIZATION" as its resource selection policy. In this case, capable resources that have less CPU utilization are preferred. Similarly, a job that requires a lot of free memory, may have "MAXIMIZE FREE MEMORY" as a resource selection policy. In this case, capable resources that have more free memory are preferred.

Figure 2:
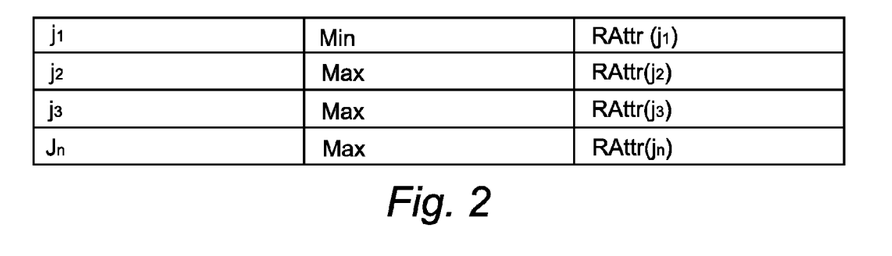
FIG. 2 illustrates a table of resource selection policies for an example of a plurality of jobs in the preferred embodiment.
Figure 3:
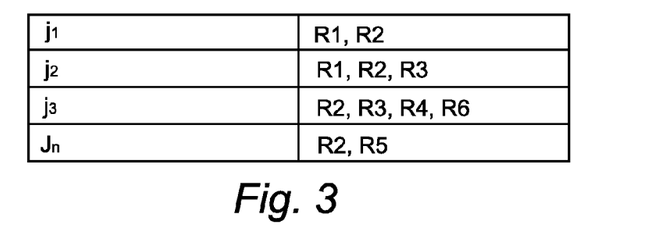
FIG. 3 illustrates a table of resources identified by the preferred embodiment for the jobs shown in FIG. 2.

Thus, for simplicity, let there be N jobs $J \in R^N$ to be executed, and let there be m(i) capable resources $\overline{R}_i \in R^{m(i)}$ for each job $j_i \in J$. Each job $j_i$ has a resource selection policy in the form MIN|MAX RAttr($r_{ip}$, $j_i$) (i=1 to N; and p=1 to m(i)), where RAttr is the attribute to be minimized or maximized. Referring to FIG. 2, for example, let job $j_1$ have a resource selection policy of selecting the resource with minimal attribute value RAttr($r_{1p}$, $j_1$). Similarly, let job $j_2$ have a resource selection policy of selecting the capable resource with maximal attribute value RAttr($r_{2p}$, $j_2$); and job $j_3$ have a resource selection policy of selecting the capable resource with maximal attribute value RAttr($r_{3p}$, $j_3$). More generically, let a job $j_n$ have a resource selection policy of selecting the capable resource with maximal attribute value RAttr($r_{np}$, $j_n$). Referring to FIG. 3, for example, let the capable resources for jobs $j_1, j_2, j_3$ and $j_n$ be $\underline{r_1} = \{r_1, r_2\}, \underline{r_2} = \{r_1, r_2, r_3\}, \underline{r_3} = \{r_2, r_3, r_4, r_6\}$ and $\underline{r_n} = \{r_2, r_5\}$.

Figure 4:
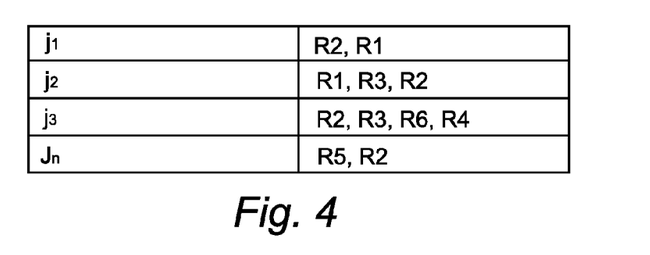
FIG. 4 illustrates a re-ordered table of the resources for the jobs in the example shown in FIG. 2.

The preferred embodiment orders the capable resources of each job $j_i$ based on the job's resource selection policy and the values of the relevant attributes of the capable resources. For example, if RAttr($r_{11}$, $j_1$)>RAttr($r_{12}$, $j_1$) and the resource selection policy requires the minimization of the relevant attribute, the ordered resource list for job $j_1$ will become $r_2, r_1$. More generally and referring to FIG. 4, the preferred embodiment uses the resource selection policies shown in FIG. 2 to re-order the resources for job $j_2$ as $r_1, r_3$ and $r_2$; the resources for job $j_3$ as $r_2, r_3, r_6$ and $r_4$; and the resources for job $j_n$ as $r_5, r_2$.

Whilst this ordering process provides an indication of the best capable resource for a given job, it does not provide any information regarding the extent to which the best capable resource excels over the other capable resources. For example, the preferred embodiment may have determined that a capable resource with 10% of CPU utilization is better than a first other capable resource with 11% of CPU utilization, or a second other capable resource with 90% of CPU utilization. However, this does not indicate that the best capable resource is marginally better than the first other capable resource and much better than the second other capable resource. Similar considerations apply to resource attributes with absolute values, such as free memory. To overcome this problem, the preferred embodiment normalizes attributes with weights in the range 0-100. For example, if the resource selection policy for a job $j_k$, comprises a maximization operation, the weighting ($W(r_k, j_k)$) on the capable resources $\underline{r_k}$ for the job $j_k$ is given by equation (1) below:

$$W(r_{kp}, j_k) = \left( \frac{RAttr(r_{kp}, j_k)}{\sum_{p=1}^{m(k)} RAttr(r_{kp}, j_k)} \right) * 100 \quad (1)$$

Similarly, if the resource selection policy for a job $j_k$, comprises a minimization operation, the weighting ($W(r_k, j_k)$) on the capable resources $\underline{r_k}$ for the job $j_k$ is given by equation (2) below:

$$W(r_{kp}, j_k) = \left( \frac{RAttr(r_{kp}, j_k)^{-1}}{\sum_{p=1}^{m(k)} RAttr(r_{kp}, j_k)^{-1}} \right) * 100 \quad (2)$$

For example, if there are three capable resources (with 10%, 11% and 90% of CPU utilization) for job $j_1$; and the job's resource selection policy comprises a minimization operation, the normalizing weights for the resources are:

$$W(r_{11}, j_1) = ((1/10)/(1/10 + 1/11 + 1/90)) * 100 =$$
$$((1/10)/(0.20202)) * 100 = 49.5$$

$$W(r_{21}, j_1) = ((1/11)/(1/10 + 1/11 + 1/90)) * 100 =$$
$$((1/11)/(0.20202)) * 100 = 45$$

$$W(r_{31}, j_1) = ((1/90)/(1/10 + 1/11 + 1/90)) * 100 =$$
$$((1/90)/(0.20202)) * 100 = 5.5$$

Similarly, if, for example, there are three resources with 1000, 900 and 100 Mb of free memory for job $j_1$; and the job's resource selection policy comprises a maximization operation, the normalizing weights for the resources are:

$$W(r_{11}, j_1) = ((1000)/(1000 + 900 + 100)) * 100 =$$
$$((1000)/(2000)) * 100 = 50$$

$$W(r_{21}, j_1) = ((900)/(1000 + 900 + 100)) * 100 =$$
$$((900)/(2000)) * 100 = 45$$

$$W(r_{31}, j_1) = ((100)/(1000 + 900 + 100)) * 100 = ((100)/(2000)) * 100 = 5$$

Figure 5:
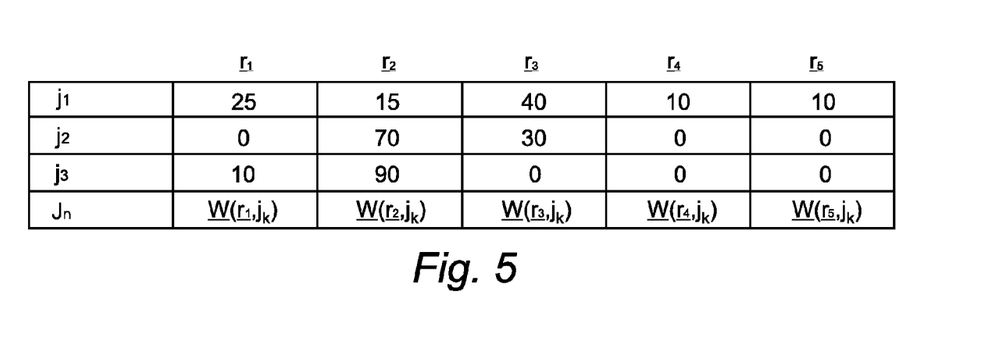
FIG. 5 illustrates a table of normalizing weights produced by the preferred embodiment for the resources listed in FIG. 3.
Figure 6:
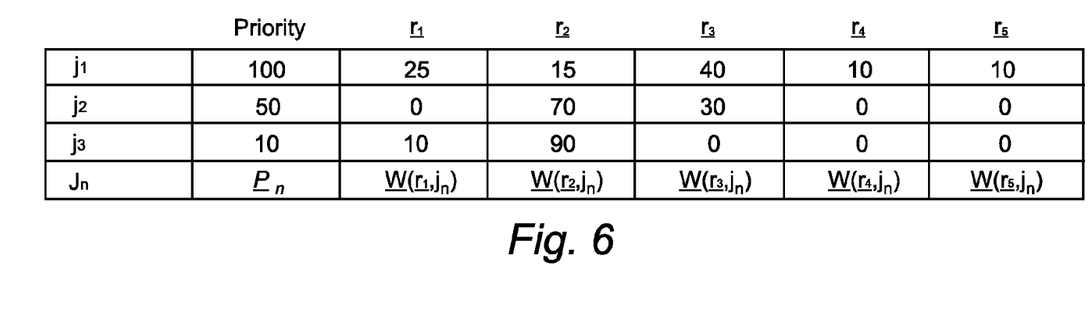
FIG. 6 illustrates a table of a weight based distribution objective for the N jobs in the example of FIG. 2.

Referring to FIG. 5, this process provides a comparable set of preference values that can be thought of as a series of workload distributions across all the available resources (wherein resources that do not match any of the requirements of a job have a weight of 0).

Step 2: Determining an Independent Workload Distribution Based on Job Priority.

The above mechanism for determining a workload distribution is essentially focuses on assessing different attributes of the available resources. However, jobs themselves have different attributes, reflected in their priorities. The preferred embodiment (optionally) considers the role of job priorities on workload distributions by calculating a prioritized weight (PW) for each capable resource of each job as follows, according to equation (3) below:

$$PW(r_k j_k) = p_i * W(r_k j_k) \tag{3}$$

Figure 7:
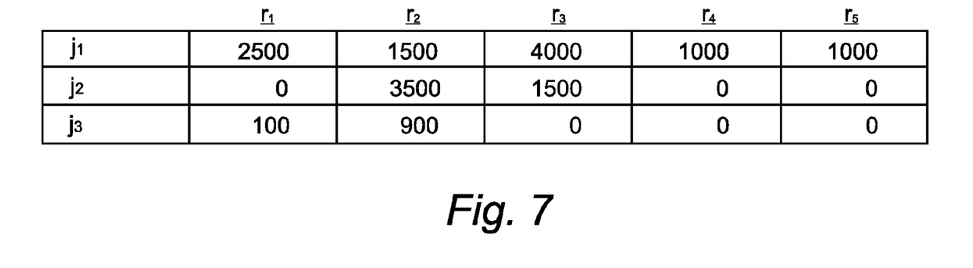
FIG. 7 illustrates a table of prioritized weights for the preferred resources of each job in the example of FIG. 2.

The resulting prioritized weights for the job are shown in FIG. 7.

Step 3: Calculating a Total Prioritized Weighting Measure

Figure 8:
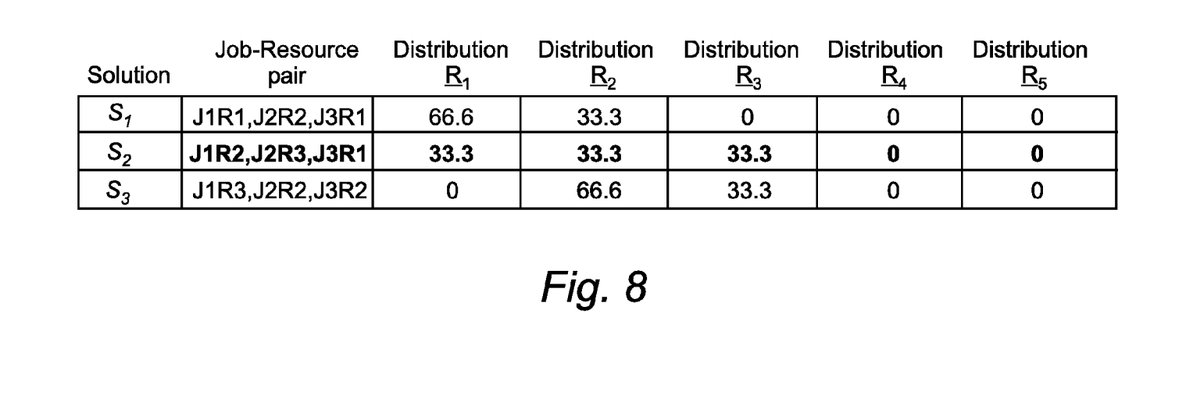
FIG. 8 illustrates a table of job-resource pairs in a plurality of possible workload distributions brought about when temporal issues are considered.

The previous steps produce a particular workload distribution that may be adopted at any given time. However, these steps do not consider the temporal aspects of resource constraints and reservations. Referring to FIG. 8, when this feature is taken into account, it can be seen that there may, in fact, be several different workload distributions possible at any given time. For example, if jobs $j_1$ and $j_2$ both consume and reserve the entirety of resource $r_1$, but not $r_2$; then $j_1$ may be deployed to $r_1$ and $j_2$ to $r_2$. Alternatively, $j_2$ may be deployed to $r_1$ and $j_1$ to $r_2$; or $j_1$ and $j_2$ to $r_2$.

For simplicity, and to avoid confusion with the workload distributions determined in the previous steps, the workload distributions produced from the consideration of the temporal aspects of resource constraints and reservations, will henceforth be known as temporal workload distributions. Thus, at any given moment, let there be n possible temporal workload distributions S, wherein each $S_k$ (k=1 to n) comprises a set $\{j_i, rlc[1dm(i)]\}$ (i=1 to N) of job, resource pairs. In the present step, the preferred embodiment assesses the merits of each possible temporal workload distribution $S_k$ based on its prioritized weights. To do this, the preferred embodiment calculates a total prioritized weighting value $TW(S_k)$ of all prioritized weights $PW(irlc[1dm(i)], j_i)$ of each temporal workload distribution $S_k$ using the following expression shown in equation (4) below:

$$TW(S_k) = \sum_{i=1}^{N} PW(S_k(j_i, r_{l\in[1\to m(i)]})) \tag{4}$$

More particularly, the total prioritized weighting $TW(S_k)$ values are normalized to the range 0-100, using the following expression indicated by equation (5) below:

$$TNW(S_k) = \frac{TW(S_k)}{\sum_{k=1}^{n} TW(S_k)} * 100 \tag{5}$$

Figure 9:
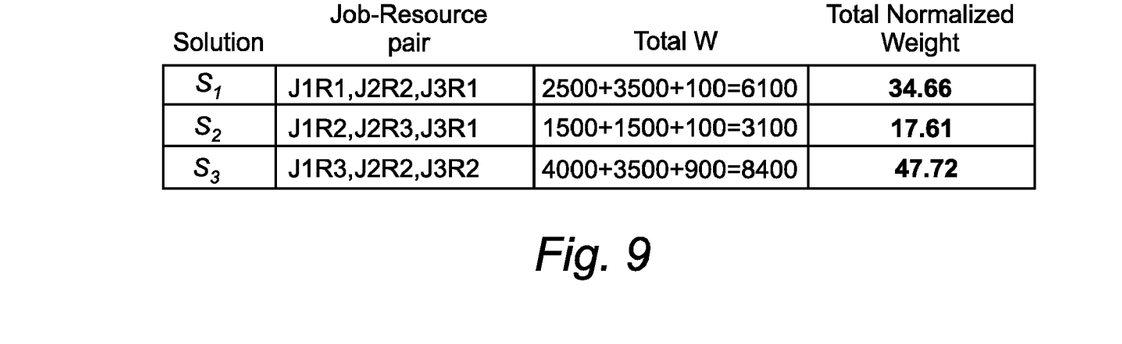
FIG. 9 illustrates a table of the total prioritized weighting values for the job-resource pairings shown in FIG. 8.

Examples of the total prioritized weighting values and normalized prioritized weighting values of the temporal workload distributions in FIG. 8 are depicted in FIG. 9. The normalized total prioritized weighting values provide a metric for comparing the merits of each of the individual temporal workload distributions. In particular, a high valued normalized total prioritized weighting indicates a good temporal workload distribution.

Step 4: Calculating a Distribution Solution Based on a Goal Distribution

In many cases, an administrator may have already specified a desired workload distribution for a system, wherein the desired workload distribution is known as a goal distribution (GD). For example, the administrator may have specified that a workload be equally distributed across all the resources. Thus, given five resources, the goal is to distribute 20% of the jobs to every resource. However, the previous steps of the preferred embodiment may have already resulted in a workload distribution that differs from the goal distribution (GD). To overcome this problem, the preferred embodiment calculates a sum delta square distribution ($\Delta Dk$), that when added to a pre-existing distribution (PD) and candidate distribution $S_k$, brings it closer to the goal distribution (GD). Accordingly, the preferred embodiment, in effect, calculates a measure of the extent to which the candidate distribution achieves the goal distribution.

Figure 10:
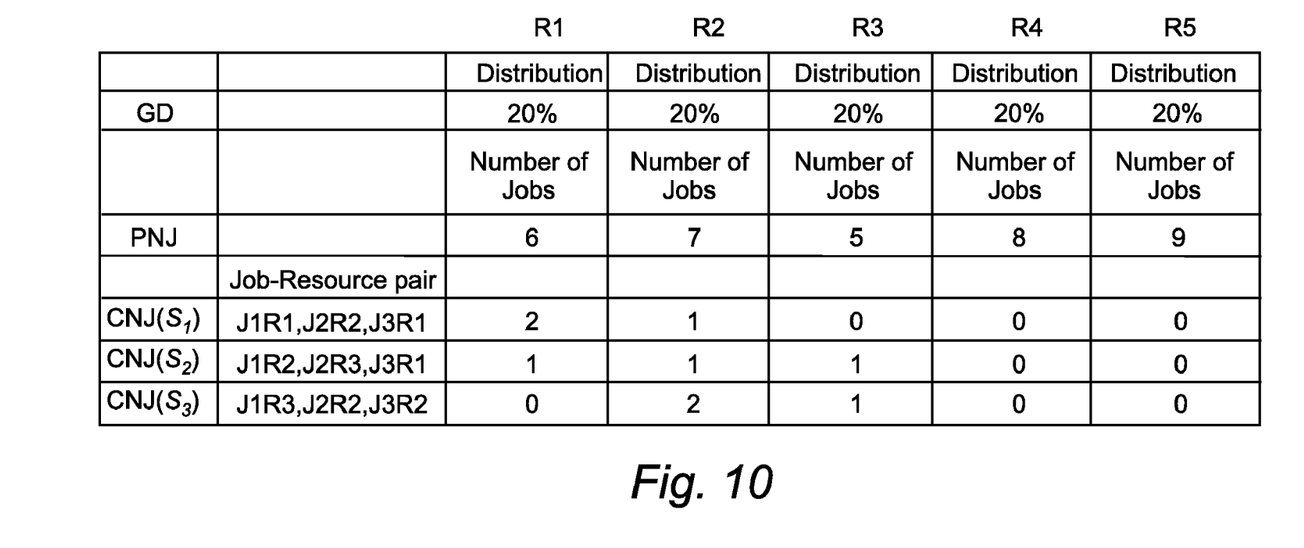
FIG. 10 illustrates a table of a goal distribution and a plurality of actual workload distributions determined using the previous steps of the preferred embodiment.

Let the pre-existing distribution (PD) be defined as the set $\{PNJ(R_1), PNJ(R_2), \ldots, PNJ(R_m)\}$ of Pre-existing Number of Jobs (PNJ) for each resource, wherein the pre-existing number of jobs PNJ represents the number of jobs running when the algorithm starts calculating the new distribution based on incoming jobs. Furthermore, let the goal distribution (GD) be defined as the set $\{GD(R_1), GD(R_2), \ldots, GD(R_m)\}$ of Goal Distributions (GD) for each resource. A distribution solution $S_k$ comprises an indication of how a plurality of incoming jobs (received by the system in a given time interval) is to be distributed amongst a finite number (m) of resources. More particularly, a distribution solution $S_k$ may be generically described as a set of current number of jobs $CNJ_k$ distributed to each of the available resources (i.e. $S_k=\{CNJ_k(R_1), CNJ_k(R_2), \ldots, CNJ_k(R_m)\}$. For example, referring to FIG. 10, the current number of jobs distributed to resource $R_1$ in the three candidate distributions $S_1$, $S_2$ and $S_3$ is $CNJ(R_1)=\{2,1,0\}$. Similarly, the current number of jobs distributed to resource $R_2$ is given by $CNJ(R_2)=\{1,1,2\}$.

The preferred embodiment calculates a projected distribution (PD) from the combination of the current numbers of jobs ($CNJ_k(R_i, i=1$ to $m)$), of a candidate distribution ($S_k$) and a pre-existing distribution (PD), in accordance with equation (6) below.

$$PD_k(R_i) = \frac{CNJ_k(R_i) + PNJ(R_i)}{\sum_{i=1}^{m} CNJ_k(R_i) + PNJ(R_i)} * 100 \tag{6}$$

where m=the number of resources.

From this information, the preferred embodiment then calculates a sum delta square distribution $\Delta D_k$ (for each resource) in accordance with equation 7 below.

$$\Delta D_k = \sum_{i=1}^{m} \Delta D_k(R_i)^2 = \sum_{i=1}^{m} (GD(R_i) - PD_k(R_i))^2 \tag{7}$$

wherein $\Delta D_k$ is normalized to 0-100 as follows in equation (8):

$$\Delta ND_k = \frac{\frac{1}{\Delta D_k}}{\sum_{k=1}^{NSol} \frac{1}{\Delta D_k}} * 100 \tag{8}$$

Figure 11:
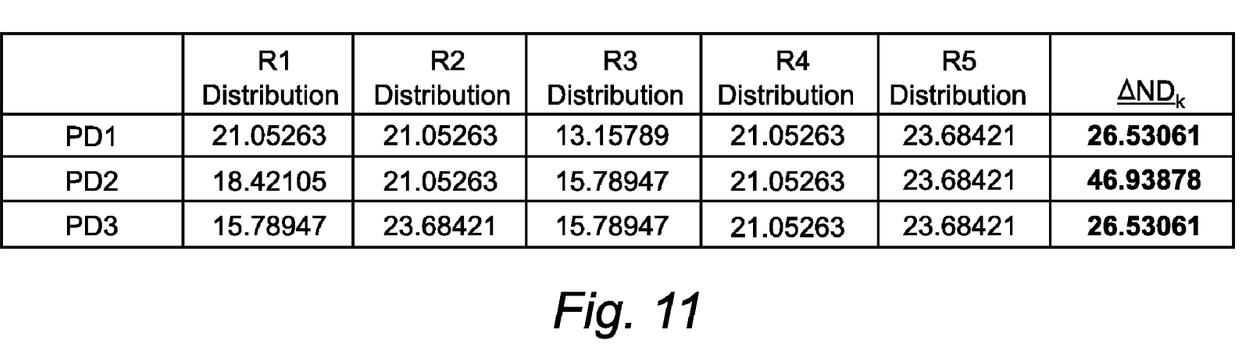
FIG. 11 illustrates a table of delta square distribution and normalized delta square distribution values for the job, resource pairs shown in FIG. 10.

The sum delta square distribution $\Delta D_k$ indicates the distance between the projected distribution and the goal distribution. In particular, a higher value of the normalized delta variable indicates a better candidate distribution solution. Taking for example, the weight distribution shown in FIG. 10, the resulting $PD_k$ and $\Delta ND_k$ are shown in FIG. 11.

Step 5: Calculating the Best Distribution Solution Based on the Goal to Maximize the Throughput Depending on resource constraints and reservations, the deployment of a job to a given resource (in a particular workload distribution) may prevent the deployment of subsequent jobs to that resource (until the first job is finished). As a result, there may in fact, be different numbers of jobs active at any given time during the implementation of a given workload distribution. This leads to problems when attempting to maintain a high throughput. Thus, the preferred embodiment calculates a measure of the extent to which a workload distribution maximizes the throughput of a system. More particularly, given a workload distribution $S_k$ comprising $\{CNJ_k(R_1), CNJ_k(R_2), \ldots, CNJ_k(R_m)\}$ of Current Number of Jobs (CNJ) for each resource, the total number of jobs $TNJ_k$ deployed in a given workload distribution is calculated using equation 9.

$$TNJ_k = \sum_{i=1}^{m} CNJ_k(R_i) \tag{9}$$

The total number of jobs $TNJ_k$ for each solution is normalized to a value in the range 0-100, to get a Total Job Distribution TJD for each workload distribution, as given by equation (10) below:

$$TJD_k = \frac{TNJ_k}{\sum_{k=1}^{NSol} TNJ_k} * 100 \tag{10}$$

Figure 12:
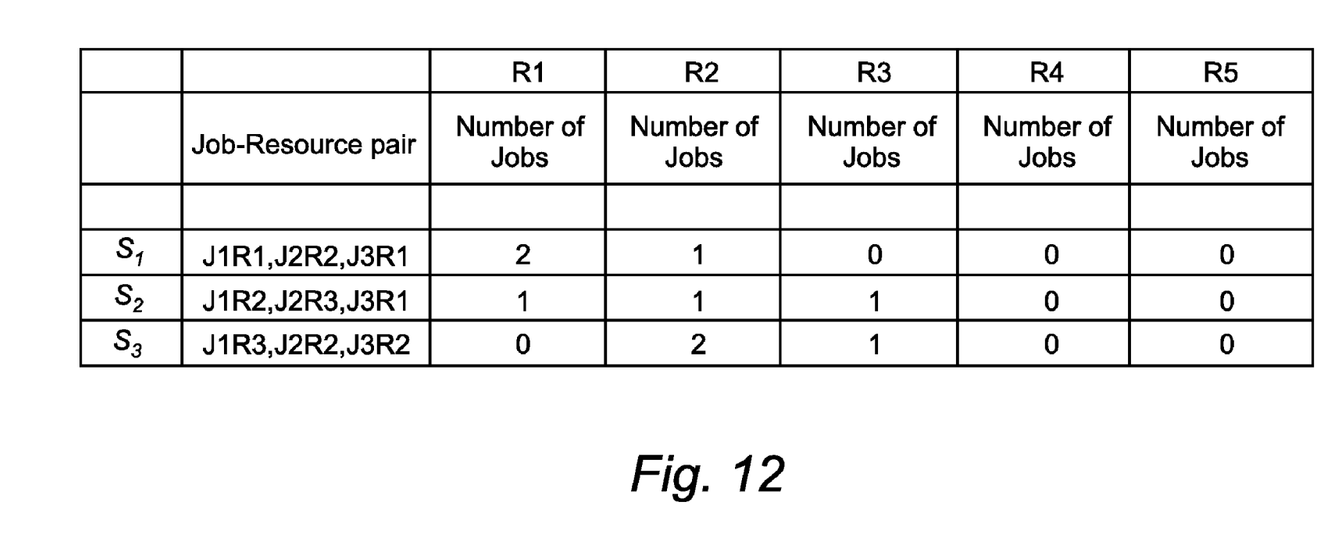
FIG. 12 illustrates a table of measures determined by the preferred embodiment, of how much each of a plurality of workload distributions contribute to the job throughput of a system.

The Total Job Distribution TJD value provides a measure of how much a workload distribution maximizes job throughput. Given the distribution shown in FIG. 12, the resulting $TJD_k$ are given by $TJD_1=33.333333$, $TJD_2=33.333333$ and $TJD_3=33.333333$ (in this case, all the $TJD_k$ values are equivalent, because all the workload distributions distribute the same number of jobs).

Step 6: Combining all Criteria to Get the Optimal Solution

In the previous steps, the preferred embodiment calculated normalized measures (0-100) that describe the benefits of a given workload distribution from different perspectives. In particular, the preferred embodiment has calculated a normalized total weight ($TNW_k$), which provides a measure of the merits of a solution compared with individual job resource distributions; a normalized delta from a goal distribution ($\Delta ND_k$), which provides a measure of the merits of a solution compared with a goal distribution; and a total job distribution ($TJD_k$) value which provides a measure of the extent to which the distribution for each solution maximizes job throughput.

Using these metrics, an optimal distribution OptD solution can be defined as the distribution that maximizes the following expression $$OptD=\text{Max}(\alpha TNW_k+\mu\Delta ND_k+\lambda TJD_k) \tag{11}$$

where $\alpha, \mu, \lambda \in [0, 1]$ may be used to have different contribution or even to exclude any criteria. By default $\alpha, \mu, \lambda$ can be set to 1, so that the optimal solution is the one that on the average is the best for all of the previously identified aspects.

Figure 13:
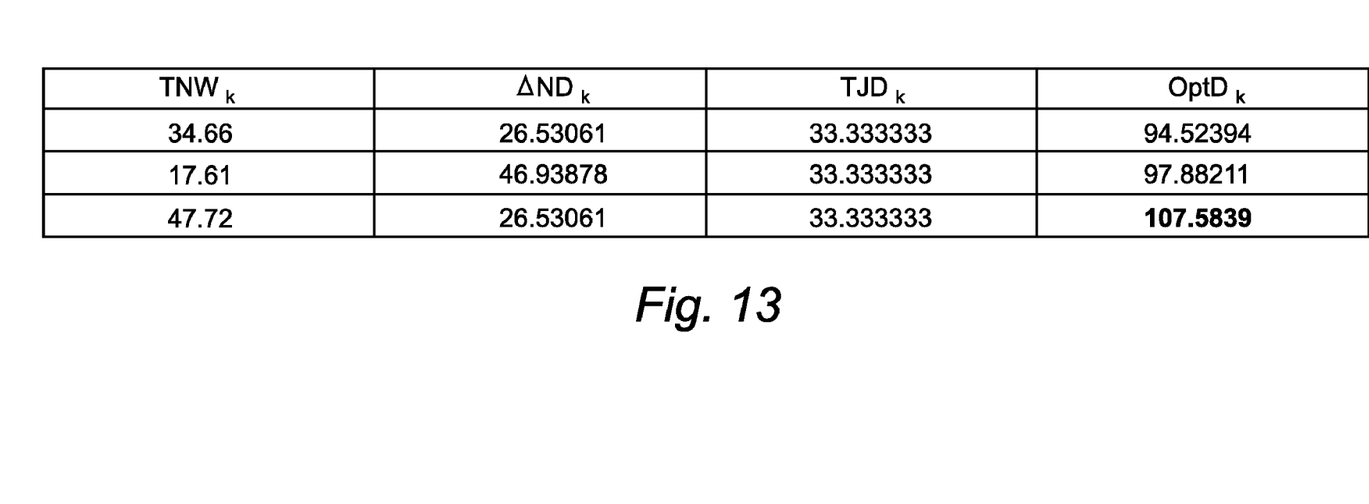
FIG. 13 illustrates a table of optimal workload distribution values produced by the preferred embodiment, using the variables shown in FIGS. 9 and 11.

Based on the examples above, the resulting OptD values are shown in FIG. 13. Referring to FIG. 13, it can be seen that the optimal workload distribution, with $\alpha, \mu, \lambda$ set to 1, is S3. Whilst this workload distribution is the best about matching of individual preferences, it is not the best in matching the goal distribution and it is equivalent to the others about throughput.

Figure 14:
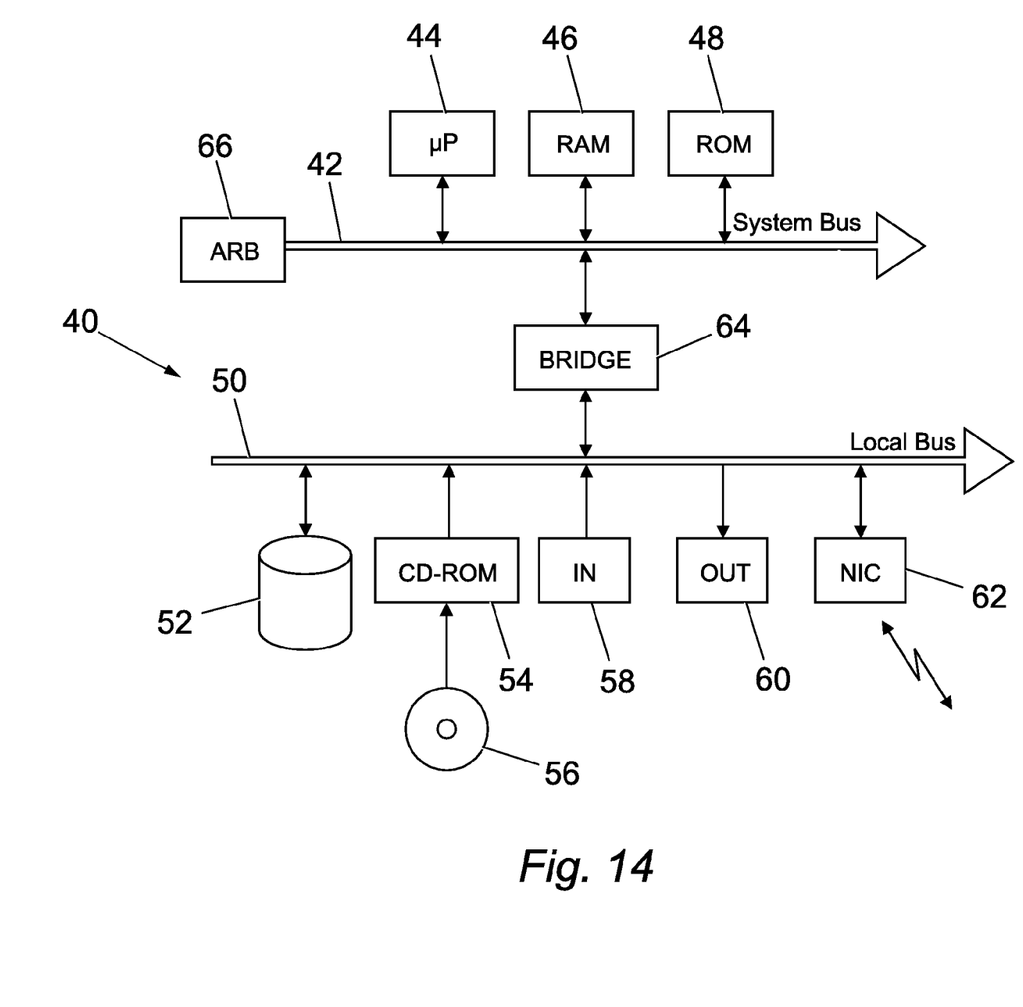
FIG. 14 illustrates a block diagram of a computer on which the preferred embodiment operates.

A computer on which the preferred embodiment operates has a generic structure shown in FIG. 14. More particularly, a generic computer of the system is denoted with 40. The computer 40 is formed by several units that are connected in parallel to a system bus 42. In detail, one or more microprocessors 44 control operation of the computer 40; a RAM 46 is directly used as a working memory by the microprocessors 44, and a ROM 48 stores basic code for a bootstrap of the computer 40. Peripheral units are clustered around a local bus 50 (by means of respective interfaces). Particularly, a mass memory consists of a hard-disk 52 and a drive 54 for reading CD-ROMs 56. Moreover, the computer 40 includes input devices 58 (e.g., a keyboard and a mouse), and output devices 60 (e.g., a monitor and a printer). A Network Interface Card (NIC) 62 is used to connect the computer 40 to the network. A bridge unit 64 interfaces the system bus 42 with the local bus 50. Each microprocessor 44 and the bridge unit 64 can operate as master agents requesting an access to the system bus 42 for transmitting information. An arbiter 66 manages the granting of the access with mutual exclusion to the system bus 42.

Alterations and modifications may be made to the above without departing from the scope of the invention. It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of distributing a plurality of jobs to a plurality of computers, the method comprising:
   determining a plurality of possible pairing of jobs to computers, in order to produce provisional distributions;
   producing a first ranking that ranks the provisional distributions according to the extent to which they satisfy the individual requirements of each job among the plurality of jobs by calculating a normalized total weight which provides a measure of merits of a solution based on individual job resource distributions;
   producing a second ranking that ranks the provisional distributions according to the extent to which they match a predefined distribution by calculating a normalized delta from a goal distribution which provides a measure of the provisional distributions from a goal distribution;
   producing a third ranking that ranks the provisional distributions according to the extent to which they maximize a throughput of the computers, wherein producing the third ranking comprises calculating a percentage of a total number of jobs for each of the provisional distributions over a total number of jobs for all of the provisional distributions;
   determining an optimal distribution from the rankings based on a one of the provisional distributions having a maximally valued combination of the first ranking, the second ranking and the third ranking, wherein the optimal solution is a maximum valued combination for all of the three identified rankings; and
   deploying each of said plurality of jobs to a respective one of the plurality of the computers in accordance with the optimal distribution.

2. The method of claim 1, wherein determining a plurality of possible pairing of the jobs to the computers, further comprises
   determining the plurality of possible pairing of jobs by pairing each of the plurality of jobs to a respective one of the plurality of computers, the method further comprising:
   producing a first provisional distribution, by allocating a first job to a computer whose resources satisfy the requirements of the first job and allocating the remaining jobs to the rest of the computers whose resources satisfy the requirements of the remaining jobs; and
   repeating the step of producing the first provisional distribution for every computer whose resources satisfy the requirements of the first job.

3. The method of claim 1, wherein producing the first ranking that ranks the provisional distributions according to the extent to which they satisfy the individual requirements of each job, further comprises:
   determining a plurality of first parameters for each provisional distribution in accordance with a resource selection policy of each job, and/or determining a plurality of second parameters for each provisional distribution in accordance with a priority of each job; and
   determining a ranking for each provisional distribution from either or both of the first and second parameters.

4. The method of claim 3, wherein determining a plurality of first parameters for each provisional distribution, further comprises:
   identifying a resource attribute associated with a resource selection policy of each job; determining a value of the resource attribute for each computer; and
   ranking the computers according to the extent to which each computer's resource attribute satisfies the resource selection policy, as compared with the resource attributes of the other computers.

5. The method of claim 1 wherein producing the second ranking that ranks the provisional distributions according to the extent to which they match a predefined distribution, further comprises:
   combining a number of jobs allocated to each computer with a number of jobs currently running on each computer; and
   subtracting the combined number of jobs for each computer, with the number of jobs allocated thereto in the predefined distribution.

6. The method of claim 1, wherein producing the third ranking that ranks the provisional distributions according to the extent to which they maximize a throughput of the computers, further comprises:
   calculating a first allocation parameter being the total number of jobs allocated by each provisional distribution to the computers;
   calculating a second allocation parameter being the total number of jobs allocated to all of the computers by all of the provisional distributions; and
   calculating the percentage of the second allocation parameter formed by the first allocation parameter.

7. The method of claim 1 wherein the plurality of possible pairing includes every possible pairing of the jobs among said plurality of jobs to the computers.

8. A system for distributing a plurality of jobs to a plurality of computers, the system comprising:
   a processor;
   a data bus coupled to said processor; and a computer-usable medium embodying computer code, said computer-usable medium being coupled to said data bus, said computer program code comprising instructions executable by said processor and configured for:
   determining a plurality of possible pairing of jobs to computers, in order to produce provisional distributions;
   producing a first ranking that ranks the provisional distributions according to the extent to which they satisfy the individual requirements of each job among the plurality of jobs by calculating a normalized total weight which provides a measure of merits of a solution based on individual job resource distributions;
   producing a second ranking that ranks the provisional distributions according to the extent to which they match a predefined distribution by calculating a normalized delta from a goal distribution which provides a measure of the provisional distributions from a goal distribution;
   producing a third ranking that ranks the provisional distributions according to the extent to which they maximize a throughput of the computers, wherein producing the third ranking comprises calculating a percentage of a total number of jobs for each of the provisional distributions over a total number of jobs for all of the provisional distributions;
   determining an optimal distribution from the rankings based on a one of the provisional distributions having a maximally valued combination of the first ranking, the second ranking and the third ranking, wherein the optimal solution is a maximum valued combination for all of the three identified rankings; and deploying each of said plurality of jobs to a respective one of the plurality of the computers in accordance with the optimal distribution.

9. The system of claim 8, wherein determining a plurality of possible pairing of the jobs to the computers, further comprises determining the plurality of possible pairing of jobs by pairing each of the plurality of jobs to a respective one of the plurality of computers, the system further comprising said computer program code configured for:

producing a first provisional distribution, by allocating a first job to a computer whose resources satisfy the requirements of the first job and allocating the remaining jobs to the rest of the computers whose resources satisfy the requirements of the remaining jobs; and repeating the step of producing the first provisional distribution for every computer whose resources satisfy the requirements of the first job.

10. The system of claim 8, wherein producing the first ranking that ranks the provisional distributions according to the extent to which they satisfy the individual requirements of each job, further comprises:

determining a plurality of first parameters for each provisional distribution in accordance with a resource selection policy of each job and/or determining a plurality of second parameters for each provisional distribution in accordance with a priority of each job; and determining a ranking for each provisional distribution from either or both of the first and second parameters.

11. The system of claim 10, wherein determining a plurality of first parameters for each provisional distribution, further comprises:

identifying a resource attribute associated with a resource selection policy of each job;

determining a value of the resource attribute for each computer; and ranking the computers according to the extent to which each computer's resource attribute satisfies the resource selection policy, as compared with the resource attributes of the other computers.

12. The system of claim 8, wherein producing the second ranking that ranks the provisional distributions according to the extent to which they match a predefined distribution, further comprises:

combining a number of jobs allocated to each computer with a number of jobs currently running on each computer; and subtracting the combined number of jobs for each computer, with the number of jobs allocated thereto in the predefined distribution.

13. The system of claim 8, wherein producing the third ranking that ranks the provisional distributions according to the extent to which they maximize a throughput of the computers, further comprises:

calculating a first allocation parameter being the total number of jobs allocated by each provisional distribution to the computers, calculating a second allocation parameter being the total number of jobs allocated to all of the computers by all of the provisional distributions; and calculating the percentage of the second allocation parameter formed by the first allocation parameter.

14. A non-transitory computer-usable medium embodying computer program code, said computer program code comprising computer executable instructions configured for:

determining a plurality of possible pairing of jobs to computers, in order to produce provisional distributions;

producing a first ranking that ranks the provisional distributions according to the extent to which they satisfy the individual requirements of each job among the plurality of by calculating a normalized total weight which provides a measure of merits of a solution based on individual job resource distributions;

producing a second ranking that ranks the provisional distributions according to the extent to which they match a predefined distribution by calculating a normalized delta from a goal distribution which provides a measure of the provisional distributions from a goal distribution;

producing a third ranking that ranks the provisional distributions according to the extent to which they maximize a throughput of the computers, wherein producing the third ranking comprises calculating a percentage of a total number of jobs for each of the provisional distributions over a total number of jobs for all of the provisional distributions;

determining an optimal distribution from the rankings based on a one of the provisional distributions having a maximally valued combination of the first ranking, the second ranking and the third ranking, wherein the optimal solution is a maximum valued combination for all of the three identified rankings; and deploying each of said plurality of jobs to a respective one of the plurality of the computers in accordance with the optimal distribution.

15. The computer-usable medium of claim 14, wherein determining a plurality of possible pairing of the jobs to the computers, further comprises determining the plurality of possible pairing of jobs by pairing each of the plurality of jobs to a respective one of the plurality of computers, the computer-usable medium further comprising computer executable instructions configured for:

producing a first provisional distribution, by allocating a first job to a computer whose resources satisfy the requirements of the first job and allocating the remaining jobs to the rest of the computers whose resources satisfy the requirements of the remaining jobs; and repeating the step of producing the first provisional distribution for every computer whose resources satisfy the requirements of the first job.

16. The computer-usable medium of claim 14, wherein producing the first ranking that ranks the provisional distributions according to the extent to which they satisfy the individual requirements of each job, further comprises:

determining a plurality of first parameters for each provisional distribution in accordance with a resource selection policy of each job, and/or determining a plurality of second parameters for each provisional distribution in accordance with a priority of each job; and determining a ranking for each provisional distribution from either or both of the first and second parameters.

17. The computer-usable medium of claim 16, wherein determining a plurality of first parameters for each provisional distribution, further comprises:

identifying a resource attribute associated with a resource selection policy of each job; determining a value of the resource attribute for each computer; and ranking the computers according to the extent to which each computer's resource attribute satisfies the resource selection policy, as compared with the resource attributes of the other computers.

18. The computer-usable medium of claim 14, wherein producing the second ranking that ranks the provisional distributions according to the extent to which they match a predefined distribution, further comprises:

combining a number of jobs allocated to each computer with a number of jobs currently running on each computer; and subtracting the combined number of jobs for each computer, with the number of jobs allocated thereto in the pre-defined distribution.

19. The computer-usable medium of claim 14, wherein producing the third ranking that ranks the provisional distributions according to the extent to which they maximize a throughput of the computers, further comprises:

calculating a first allocation parameter being the total number of jobs allocated by each provisional distribution to the computers;

calculating a second allocation parameter being the total number of jobs allocated to all of the computers by all of the provisional distributions; and calculating the percentage of the second allocation parameter formed by the first allocation parameter.

* * * * *